United States Patent
Patwardhan (10) Patent No.: US 9,465,810 B2
(45) Date of Patent: Oct. 11, 2016

(54) METHOD AND SYSTEM FOR A FAST FULL STYLE SYSTEM CHECK USING MULTITHREADED READ AHEAD

(75) Inventor: Kedar Shrikrishna Patwardhan, Maharashtra (IN)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 365 days.

(21) Appl. No.: 13/187,239

(22) Filed: Jul. 20, 2011

(65) Prior Publication Data
US 2013/0024428 A1    Jan. 24, 2013

(51) Int. Cl.
G06F 17/30    (2006.01)

(52) U.S. Cl.
CPC .................. G06F 17/302 (2013.01)

(58) Field of Classification Search
CPC ................................. G06F 17/30129
See application file for complete search history.

(56) References Cited

U.S. PATENT DOCUMENTS

| | | | |
|---|---|---|---|
| 7,631,155 B1* | 12/2009 | Bono et al. | 711/156 |
| 2003/0131204 A1* | 7/2003 | Lin et al. | 711/152 |
| 2009/0055823 A1* | 2/2009 | Zink et al. | 718/100 |

* cited by examiner

Primary Examiner — Syed Hasan
(74) Attorney, Agent, or Firm — Wilmer Cutler Pickering Hale and Dorr LLP (57) ABSTRACT

A method for file system checking in a storage device. The method includes executing a computer system having a plurality microprocessor cores, initiating a file system check operation by using a file system check agent that execute on the computer system and accesses a storage device, and validating a plurality of meta-data structures of the file system. The method further includes dividing and allocating the metadata structures among a plurality of worker threads. For each worker thread, data corresponding to the metadata structures is processed using a read ahead operation. file system check is processed to completion, wherein the read ahead operation feeds data corresponding to the metadata structures to each of the plurality of worker threads in parallel.

20 Claims, 9 Drawing Sheets

METHOD AND SYSTEM FOR A FAST FULL STYLE SYSTEM CHECK USING MULTITHREADED READ AHEAD

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

A volume manager is often used to manage large-scale centralized computer storage systems. However, problems exist where, in such systems, the file systems grow large enough to become multi-terabyte filesystems. Companies that have created multi-terabyte file systems often complain that full file system check of the file system results in hours or even days of down time. This delay is so severe that companies often decided to size the file system based on the amount of time it would take to full file system check on that file system.

SUMMARY OF THE INVENTION

In one embodiment, the present invention comprises a computer implemented method for file system checking in a storage device. The method includes executing a computer system having a plurality microprocessor cores, initiating a file system check operation by using a file system check agent that execute on the computer system and accesses a storage device, and validating a plurality of meta-data structures of the file system. The method further includes dividing and allocating the metadata structures among a plurality of worker threads. For each worker thread, data corresponding to the metadata structures is processed using a read ahead operation. file system check is processed to completion, wherein the read ahead operation feeds data corresponding to the metadata structures to each of the plurality of worker threads in parallel.

In one embodiment, the plurality of worker threads comprises file system checker threads.

In one embodiment, the plurality of worker threads comprises read ahead component threads.

In one embodiment, the file system check validates whether data is listed with a properly connecting parent directory.

In one embodiment, the read ahead operation utilizes a parallel I/O capability of the storage device.

In one embodiment, the plurality of worker threads execute in parallel on the plurality of microprocessor cores of the computer system.

In one embodiment, the metadata structures comprise a plurality of inodes.

In one embodiment, the present invention is implemented as a computer readable storage medium having stored thereon, computer executable instructions that, if executed by a computer system cause the computer system to perform a fast file system check method. The method includes executing a computer system having a plurality microprocessor cores, initiating a file system check operation by using a file system check agent that execute on the computer system and accesses a storage device, and validating a plurality of meta-data structures of the file system. The method further includes dividing and allocating the metadata structures among a plurality of worker threads. For each worker thread, data corresponding to the metadata structures is processed using a read ahead operation. file system check is processed to completion, wherein the read ahead operation feeds data corresponding to the metadata structures to each of the plurality of worker threads in parallel.

In one embodiment, the plurality of worker threads comprises file system checker threads.

In one embodiment, the plurality of worker threads comprises read ahead component threads.

In one embodiment, the file system check validates whether data is listed with a properly connecting parent directory.

In one embodiment, the read ahead operation utilizes a parallel I/O capability of the storage device.

In one embodiment, the plurality of worker threads execute in parallel on the plurality of microprocessor cores of the computer system.

In one embodiment, the metadata structures comprise a plurality of inodes.

In one embodiment, the present invention is implemented as a computer system having a multicore microprocessor coupled to a memory, the memory having computer readable instructions which when executed by the microprocessor cause the computer system to perform a fast file system check method. The method includes executing a computer system having a plurality microprocessor cores, initiating a file system check operation by using a file system check agent that execute on the computer system and accesses a storage device, and validating a plurality of meta-data structures of the file system. The method further includes dividing and allocating the metadata structures among a plurality of worker threads. For each worker thread, data corresponding to the metadata structures is processed using a read ahead operation. File system check is processed to completion, wherein the read ahead operation feeds data corresponding to the metadata structures to each of the plurality of worker threads in parallel.

In one embodiment, the plurality of worker threads comprises file system checker threads.

In one embodiment, the plurality of worker threads comprises read ahead component threads.

In one embodiment, the file system check validates whether data is listed with a properly connecting parent directory.

In one embodiment the read ahead operation utilizes a parallel I/O capability of the storage device.

In one embodiment the plurality of worker threads execute in parallel on the plurality of microprocessor cores of the computer system.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 1:
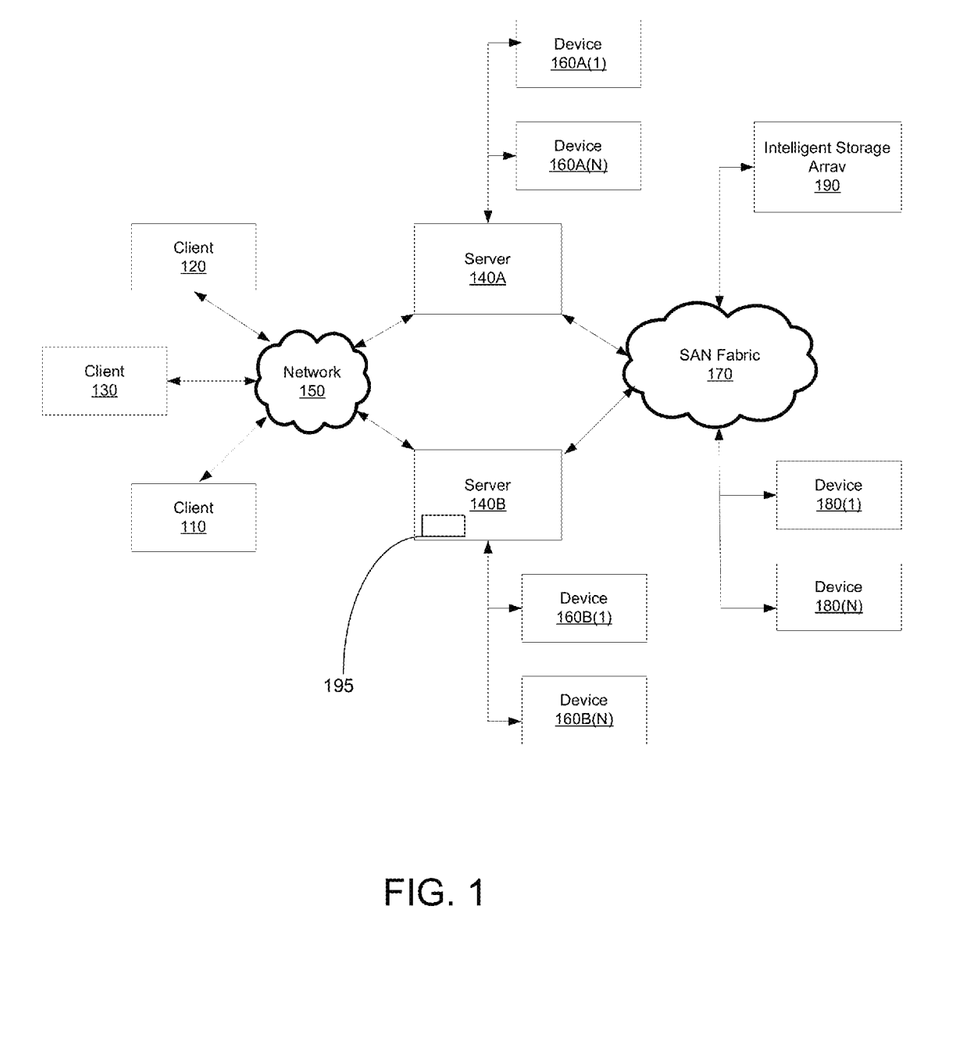
FIG. 1 shows a diagram depicting a network architecture of a client server based computing system in accordance with one embodiment of the present invention.

FIG. 1 is a block diagram depicting a network architecture 100 in which client systems 110, 120 and 130, as well as storage servers 140A and 140B (e.g., it will and any of which can be implemented using computer system 200), are coupled to a network 150 in accordance with one embodiment of the present invention. A storage server 140A is further depicted as having storage devices 160A(1)-(N)

directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a file system check agent 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
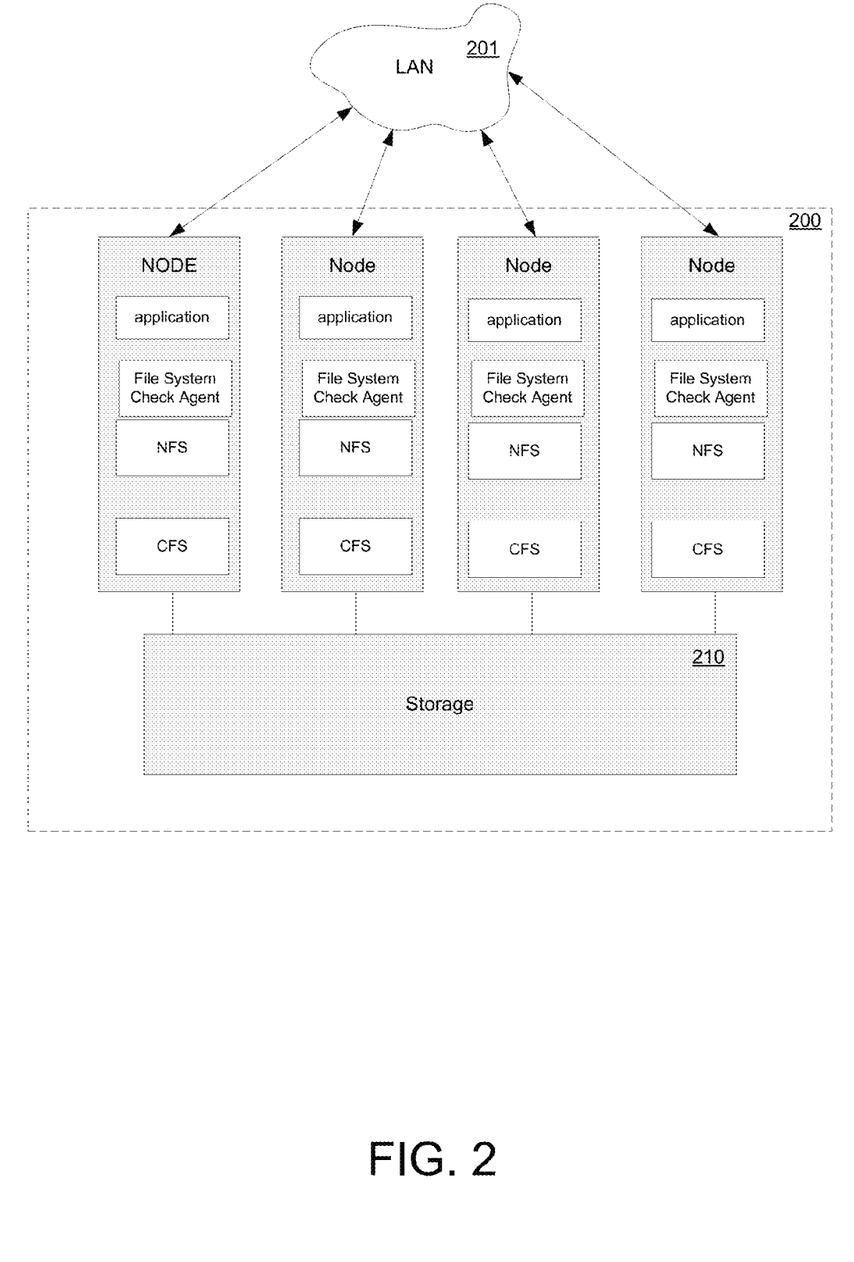
FIG. 2 shows a diagram depicting an exemplary high availability cluster-based computing system in accordance with one embodiment of the present invention.

FIG. 2 shows a diagram depicting an exemplary high availability cluster-based computing system 200 in accordance with one embodiment of the present invention. As illustrated in FIG. 2, 4 nodes are shown coupled to a common storage device 210. In one embodiment, the nodes on each host are an instantiation comprising an application, a file system check agent, a network file system (NFS) and a cluster file system (CFS). Hence, the computer system 200 comprises a four node cluster. Each of the constituent nodes is shown connected to the storage device 210. The nodes of the cluster communicate with one another via the local area network 201. These local area networks can in turn be connected to one or more wide area networks (e.g., the Internet). Although the embodiment is described in the context of a cluster, it should be appreciated that embodiments of the present invention can readily scale and function in distributed computer systems and/or cloud based computer systems having hundreds or thousands of nodes.

FIG. 2 shows the manner in which the common storage device can support the mounting and dismounting of the various file systems to which it provides data storage services. The storage device 210 is typically equipped to provide high availability and redundancy while maintaining flexibility of the storage services provided to the various file systems. The storage device 210 typically includes a disk array that functions by providing storage space for mounting file systems and for providing high availability and disaster recovery type functionality for the file systems.

Figure 3:
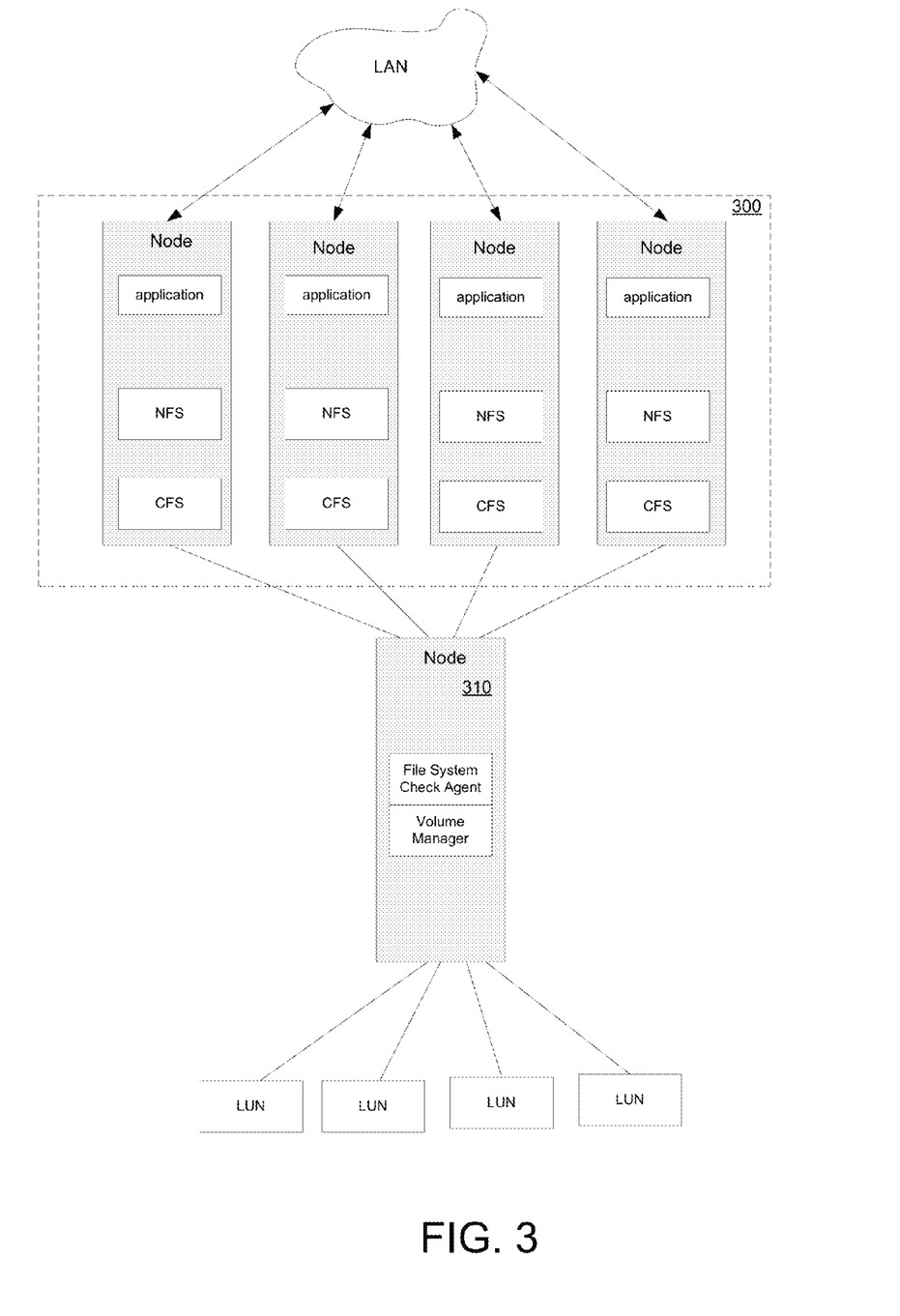
FIG. 3 shows a first exemplary implementation of a storage device in accordance with one embodiment of the present invention.

FIG. 3 shows a first exemplary implementation of a storage device in accordance with one embodiment of the present invention. As depicted in FIG. 3, the 4 nodes of the cluster 300 are coupled to node 310 which hosts a volume manager and the file system check agent. The volume manager functions with a plurality of coupled LUNs (e.g., disk drives, solid-state drives, or the like) to provide volumes (e.g., data storage) which can be used to mount the plurality of network file systems and cluster file systems.

As depicted in FIG. 3, the 4 nodes of the cluster 300 are coupled to a node 310 which hosts a volume manager and the file system check agent. However, in the FIG. 3 embodiment, the volume manager functions with a plurality of LUNs (e.g., that can be created by the storage array 210). For example, the storage device 210 can be used to provide LUNs which can then be used to mount the plurality of network file systems and cluster file systems and the like.

Figure 4:
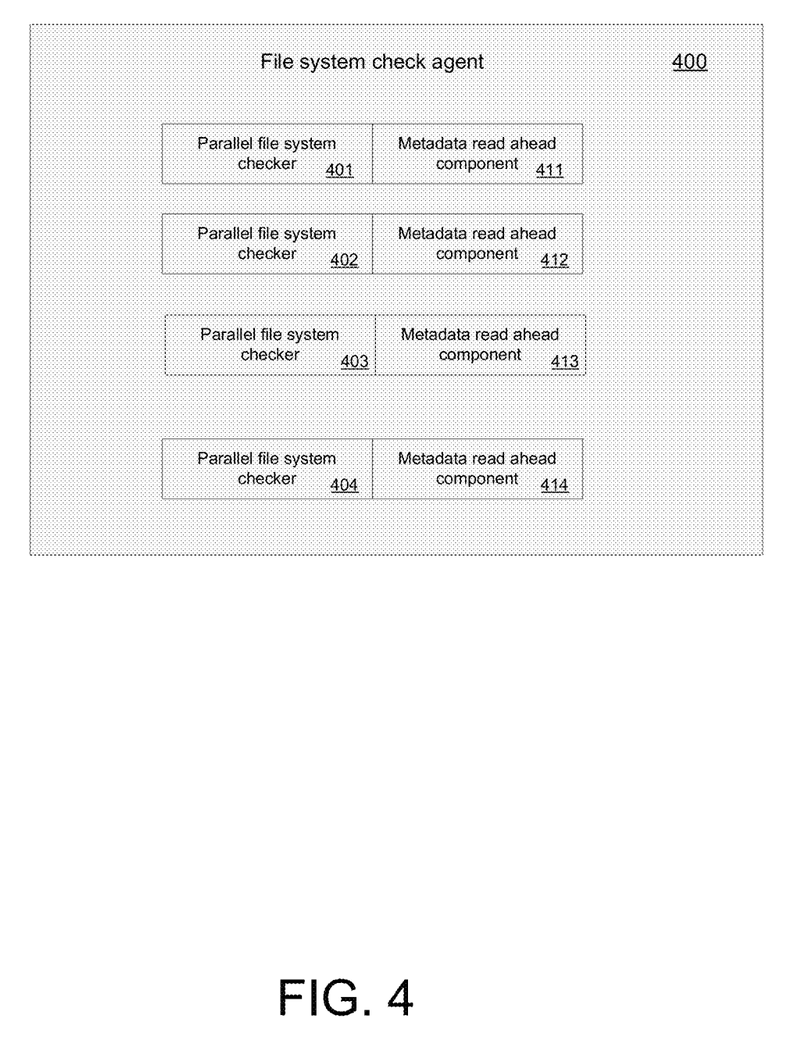
FIG. 4 shows a diagram of an exemplary file system check agent in accordance with one embodiment of the present invention.

FIG. 4 shows a diagram of an exemplary file system check agent 400 in accordance with one embodiment of the present invention. As depicted in FIG. 4, the agent 400 includes a plurality of parallel file system checkers 401-404 and a corresponding plurality of metadata read ahead components 411-414.

Embodiments of the present invention overcome the problems that plague conventional full file system checks on terabyte size file systems. Embodiments of the present invention advantageously utilize the plurality of file system checkers and the plurality of metadata read ahead components to create multiple threads that can perform file system check functions on multiple different parts of a file system in parallel. Additionally, the multiple metadata read ahead components advantageously initiate meta-data read on a per thread basis. These features provided by the functionality of embodiments of the present invention can typically result in a 90% improvement in full file system check execution time in comparison to the conventional solution. Thus, embodiments of the present invention enable customers to create multi-terabyte file systems without fear that a full file system check of the file system would result in hours or even days of down time. This factor enables customers to size their file systems in accordance with their needs, as opposed to sizing the file system based on the amount of time it would take to perform a full file system check on it.

Figure 5:
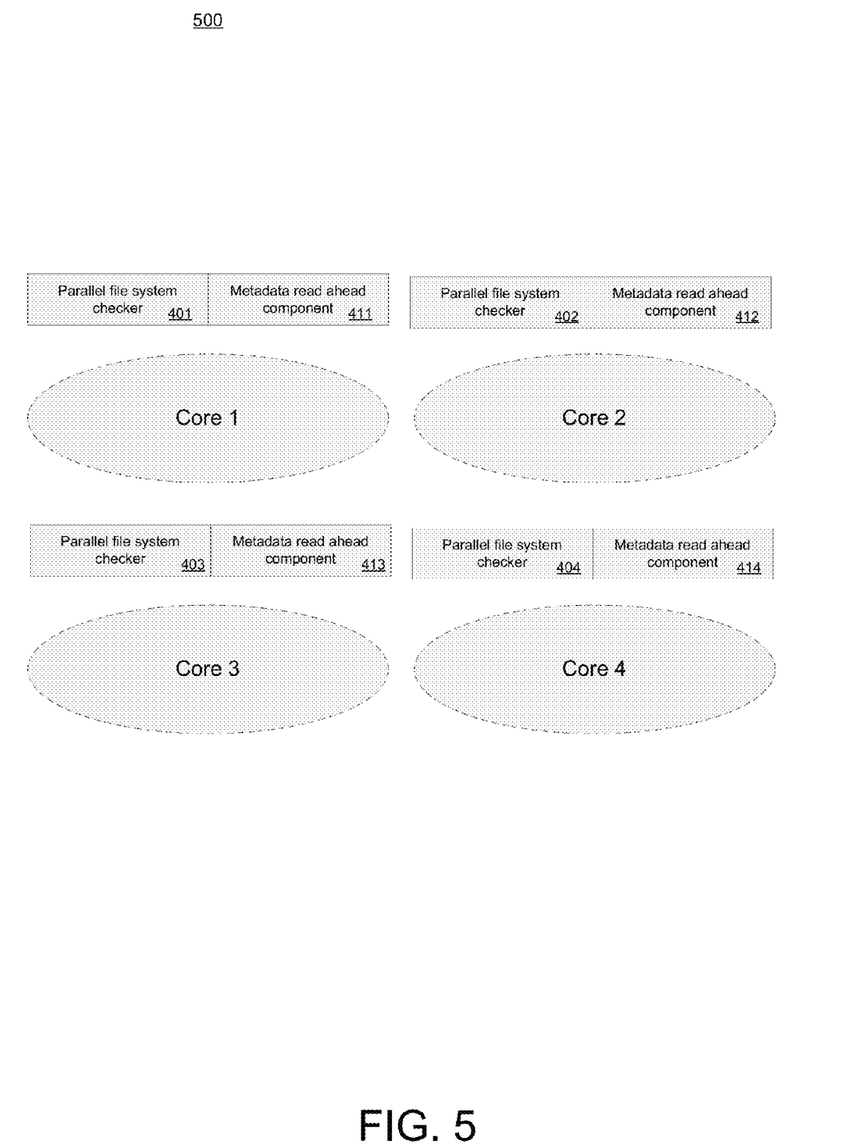
FIG. 5 shows a diagram of the parallel file system checkers and the metadata read ahead components as they form threads that execute in parallel on for cores of a microprocessor of a computer system in accordance with one embodiment of the present invention.

FIG. 5 shows a diagram of the parallel file system checkers 401-404 and the metadata read ahead components 411-414 as they form threads that execute in parallel on for cores of a microprocessor of a computer system in accordance with one embodiment of the present invention. As described above, the file system check agent advantageously utilizes the plurality of parallel file system checkers and the plurality of parallel data ahead components to create multiple threads. These multiple threads can perform file system check functions on multiple different parts of a file system in parallel. Hence, the parallel file system checkers 401-404 run in parallel on respective cores 1 through 4. In the FIG. 5 embodiment, the multiple metadata read ahead components execute with their corresponding parallel file system checker on a respective core.

Figure 6:
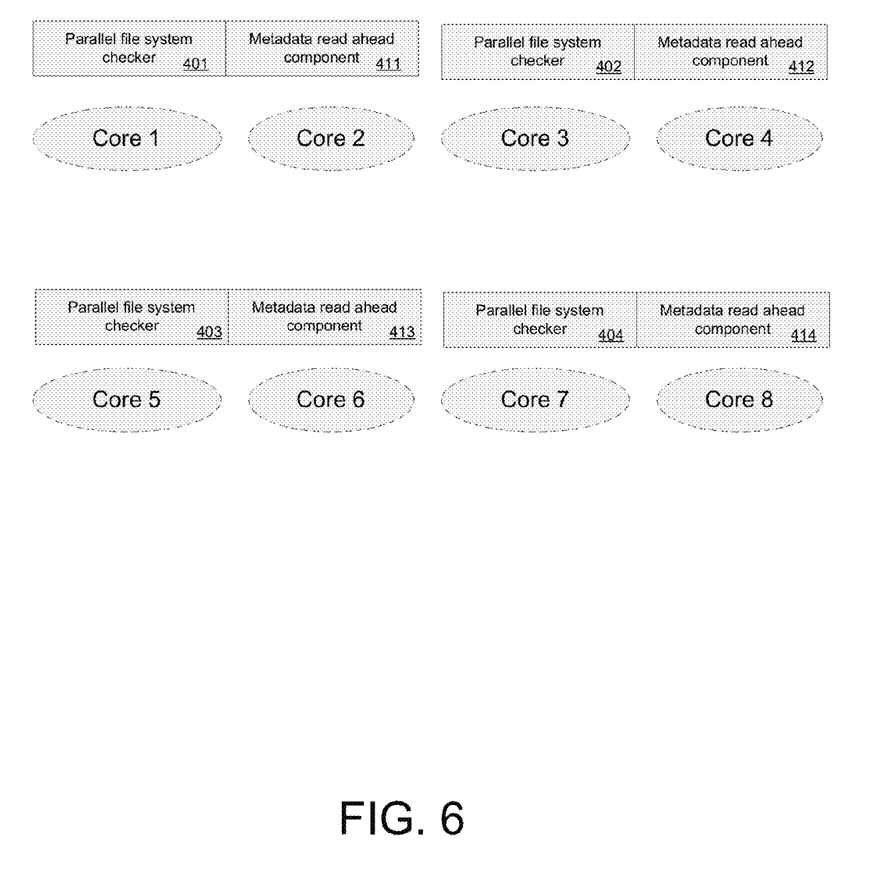
FIG. 6 shows a second diagram of the parallel file system checkers and the metadata read ahead components as they form threads that execute in parallel on for cores of a microprocessor of a computer system in accordance with one embodiment of the present invention.

FIG. 6 shows a diagram of the parallel file system checkers 401-404 and the metadata read ahead components 411-414 as they form threads that execute in parallel on for cores of a microprocessor of a computer system in accordance with one embodiment of the present invention. As described above, the file system check agent advantageously utilizes the plurality of parallel file system checkers and the plurality of parallel data ahead components to create multiple threads. However, in the FIG. 6 embodiment, the multiple metadata read ahead components and the multiple parallel file system checkers each execute with their own respective core. This feature greatly increases the number of parallel threads that can perform file system check functions on multiple different parts of a file system in parallel, thereby generating a large increase in performance.

Figure 7:
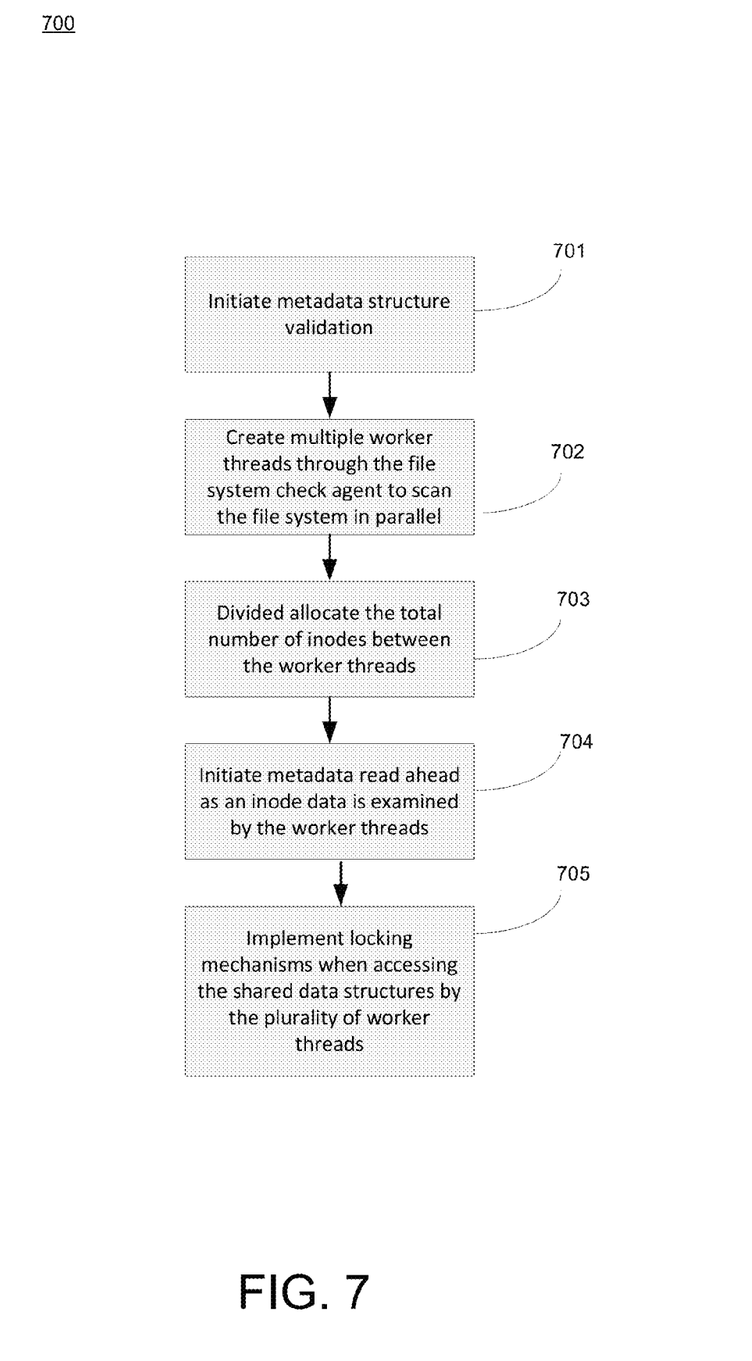
FIG. 7 shows a flowchart of the steps of a process for performing a fast file system check in accordance with one embodiment of the present invention.

FIG. 7 shows a flowchart of the steps of a process 700 for performing a fast file system check in accordance with one embodiment of the present invention.

As described above, embodiments of the present invention implement a file system check agent that creates a multithreaded execution environment that scans various metadata structures, validates them, corrects them if required and repairs the file system. This multithreaded approach advantageously utilizes a multicore system CPU and advantageously utilizes the ability of the storage subsystem (e.g., storage subsystem 210) to service multiple input outputs concurrently.

The file system check agent creates multiple threads parallel file system checkers to scan various parts of a file s system in parallel. Additionally, as described above, each file system checker thread triggers it's corresponding data read-ahead components to make maximum use of storage array I/O throughput and to make sure the file system checker threads undergo as little blocked on I/O as possible. This feature can typically allow a full file system check to becomes approximately twice to 10 times as fast (e.g., or more) in comparison to a conventional file system check approach.

Process 700 begins in step 701, where the basic metadata structures of a file system like super block and metadata inodes (e.g., structural file set inodes) are validated.

In step 702, the file system check agent creates multiple parallel file system checker threads to scan various parts of the file system in parallel.

In step 703, the total number of inodes (e.g., the metadata descriptors that identify attributes of the various data blocks) in the file system are now divided and initiates read ahead allocated between worked threads and each worker thread reads a block worth of it's own inodes and initiates read-ahead on a few blocks of the remaining blocks of it's list of inodes to be validated.

In step 704, as an inode is taken for validation by a thread, a read-ahead is initiated on other inode related metadata that comprises the inode (e.g., like block-maps, inode maps, etc) as that related metadata becomes available. In one embodiment, a read-ahead is initiated to check whether the inode is properly connected to a parent directory, or the like. In such an embodiment, as a block map of the inode becomes available, a read-ahead is also issued on the extent maps (or allocation unit maps) comprising the inode and other related metadata of the inode. In this manner, embodiments of the present invention take advantage of the fact that as metadata becomes available, read-aheads can be issued on related metadata is in fact referenced by the metadata just read in.

Subsequently, in step 705, various checks like duplicate block map check, directory connectivity check, unreferenced inode check, and the like, are split between worker threads with proper locking when accessing shared data structures.

Figure 8:
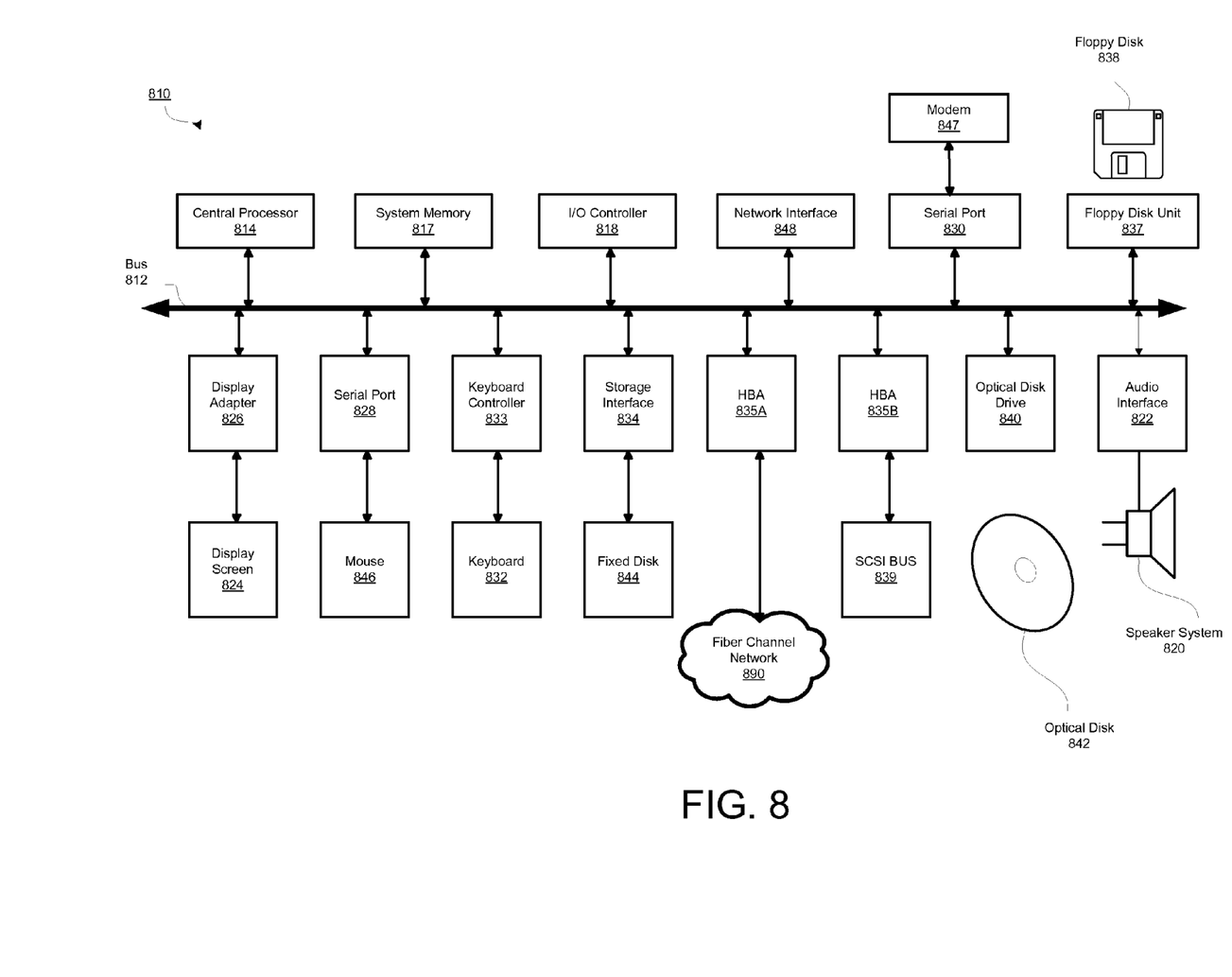
FIG. 8 depicts a block diagram of a computer system suitable for implementing certain functionality in accordance with one embodiment of the present invention.

FIG. 8 depicts a block diagram of a computer system 810 suitable for implementing certain functionality in accordance with one embodiment of the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fiber Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. In the FIG. 8 embodiment, the system memory 817 instantiates a reclamation manager module 850 which implements the continuous reclamation functionality described above. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
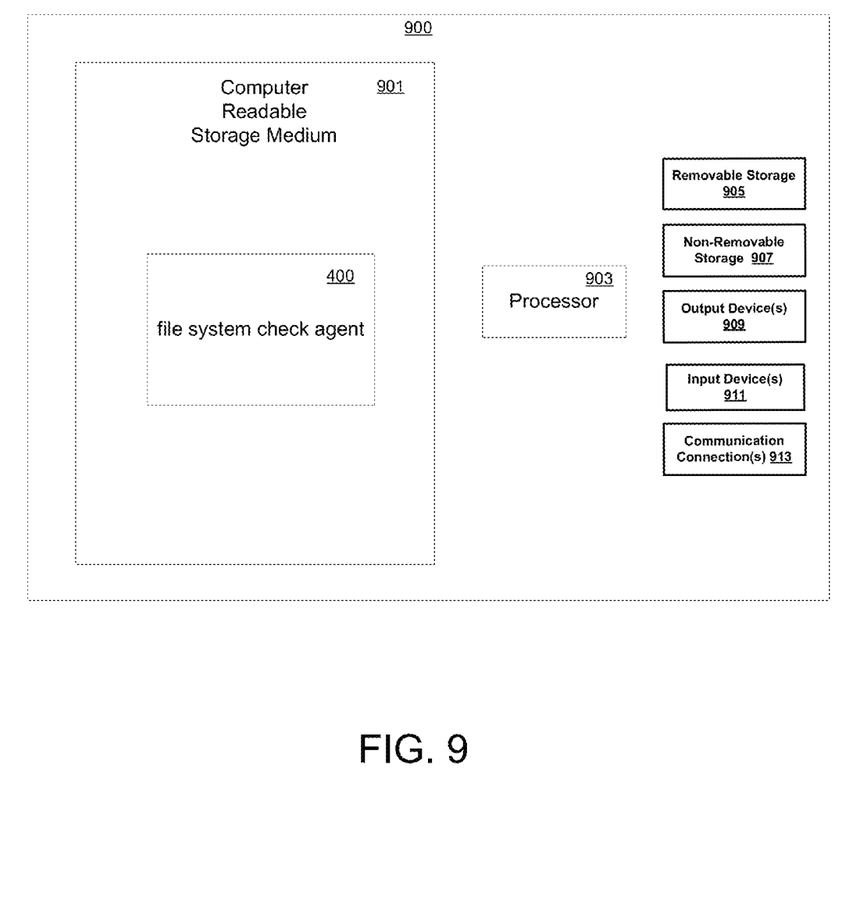
FIG. 9 shows an exemplary computer system according to one embodiment.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the one or more software agents (e.g., file system check agent 400 from FIG. 4) are instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer readable media (e.g., computer readable storage medium 901). Computer readable media can be a number of different types of available media that can be accessed by computer system 900 and can include, but is not limited to, computer storage media.

In its most basic configuration, computer system 900 typically includes processing unit 903 and memory 901. Depending on the exact configuration and type of computer system 900 that is used, memory 901 can be volatile (e.g., such as DRAM, etc.) 901a, non-volatile 901b (e.g., such as ROM, flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 909 and/or output devices 911 (e.g., such as a display). Computer system 900 can further include network connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for file system checking in a storage device, comprising:
    executing a computer system having a plurality microprocessor cores;
    initiating a check operation on a file system using a file system check agent that executes on the computer system and accesses a storage device, wherein the file system check agent is shared by the plurality microprocessor cores;
    validating a plurality of metadata structures of the file system;
    dividing and allocating the metadata structures among a plurality of worker threads;
    for each worker thread, processing data corresponding to the metadata structures using a respective read ahead operation, wherein successive read ahead operations are issued on additional metadata related to the metadata structures as the metadata structures become available, wherein the additional metadata comprise an extent map; and
    processing the file system check to completion including executing at least an unreferenced inode check using one of the worker threads, wherein the respective read ahead operations feed data corresponding to the metadata structures to each of the plurality of worker threads in parallel, wherein the respective read ahead operations maximize data throughput for the check operation and minimize blocked input and output (I/O) for each worker thread.

2. The method of claim 1, wherein the plurality of worker threads comprises file system checker threads.

3. The method of claim 1, wherein the plurality of worker threads comprises read ahead component threads.

4. The method of claim 2, wherein the file system check operation validates whether data is listed with a connected parent directory.

5. The method of claim 1, wherein the read ahead operation utilizes a parallel I/O capability of the storage device.

6. The method of claim 1, wherein the plurality of worker threads execute in parallel on the plurality of microprocessor cores of the computer system.

7. The method of claim 1, wherein the metadata structures comprise a plurality of inodes.

8. A non-transitory computer readable storage medium having stored thereon, computer executable instructions that, if executed by a computer system cause the computer system to perform a method comprising:
    executing a computer system having a plurality microprocessor cores;
    initiating a check operation on a file system using a file system check agent that executes on the computer system and accesses a storage device, wherein the file system check agent is shared by the plurality microprocessor cores;
    validating a plurality of metadata structures of the file system;
    dividing and allocating the metadata structures among a plurality of worker threads;
    for each worker thread, processing data corresponding to the metadata structures using a respective read ahead operation, wherein successive read ahead operations are issued on additional metadata related to the metadata structures as the metadata structures become available, wherein the additional metadata comprise an extent map; and processing the file system check to completion including executing at least an unreferenced inode check using one of the worker threads, wherein the respective read ahead operations feed data corresponding to the metadata structures to each of the plurality of worker threads in parallel, wherein the respective read ahead operations maximize data throughput for the check operation and minimize blocked I/O for each worker thread.

9. The non-transitory computer readable storage medium of claim 8, wherein the plurality of worker threads comprises file system checker threads.

10. The non-transitory computer readable storage medium of claim 8, wherein the plurality of worker threads comprises read ahead component threads.

11. The non-transitory computer readable storage medium of claim 8, wherein the file system check operation validates whether data is listed with a connected parent directory.

12. The non-transitory computer readable storage medium of claim 8, wherein the read ahead operation utilizes a parallel PO capability of the storage device.

13. The non-transitory computer readable storage medium of claim 8, wherein the plurality of worker threads execute in parallel on the plurality of microprocessor cores of the computer system.

14. The non-transitory computer readable storage medium of claim 8, wherein the metadata structures comprise a plurality of inodes.

15. A computer system having a multicore microprocessor coupled to a memory, the memory having computer readable instructions which when executed by the microprocessor cause the computer system to perform a fast file system check, comprising:

executing a computer system having a plurality microprocessor cores;

initiating a check operation on a file system using a file system check agent that executes on the computer system and accesses a storage device, wherein the file system check agent is shared by the plurality microprocessor cores;

validating a plurality of metadata structures of the file system;

dividing and allocating the metadata structures among a plurality of worker threads;

for each worker thread, processing data corresponding to the metadata structures using a respective read ahead operation, wherein successive read ahead operations are issued on additional metadata related to the metadata structures as the metadata structures become available, wherein the additional metadata comprise an extent map; and processing the file system check to completion including executing at least an unreferenced inode check using one of the worker threads, wherein the respective read ahead operations feed data corresponding to the metadata structures to each of the plurality of worker threads in parallel, wherein the respective read ahead operations maximize data throughput for the check operation and minimize blocked I/O for each worker thread.

16. The computer system of claim 15, wherein the plurality of worker threads comprises file system checker threads.

17. The computer system of claim 15, wherein the plurality of worker threads comprises read ahead component threads.

18. The computer system of claim 15, wherein the read ahead operation utilizes a parallel I/O capability of the storage device.

19. The computer system of claim 15, wherein the file system check operation validates whether data is listed with a connected parent directory.

20. The computer system of claim 15, wherein the metadata structures comprise a plurality of inodes.

* * * * *